United States Patent [19]
Corby, Jr.

[11] Patent Number: 5,633,716
[45] Date of Patent: May 27, 1997

[54] SELF-ALIGNING RETROREFLECTOR TARGET CARRIER

[75] Inventor: Nelson R. Corby, Jr., Scotia, N.Y.

[73] Assignee: General Electric Company, Schenectady, N.Y.

[21] Appl. No.: 574,016

[22] Filed: Dec. 18, 1995

[51] Int. Cl.$^6$ .................... G01B 11/00; G01B 11/26; G01B 11/02
[52] U.S. Cl. .................... 356/375; 356/139.05; 356/383
[58] Field of Search ................ 356/45, 345, 357, 356/358, 363, 375, 4, 5, 28.5, 28, 4.5, 3, 16, 147, 139.01, 139.08

[56] References Cited

U.S. PATENT DOCUMENTS

| | | | |
|---|---|---|---|
| 4,436,417 | 3/1984 | Hutchin | 356/4.5 |
| 4,600,299 | 7/1986 | Abshire | 356/5 |

*Primary Examiner*—Frank Gonzalez
*Assistant Examiner*—Michael P. Stafira
*Attorney, Agent, or Firm*—Lawrence P. Zale; Marvin Snyder

[57] ABSTRACT

A distance measurement system employs a monochromatic coherent light source which produces an outgoing ray which impinges upon a target reflector which reflects the beam back as a reflected beam to an interferometry detector. A portion of the outgoing ray also is delivered to the interferometry detector. As the target reflector position is changed, the interferometry detector continuously calculates changes in distance of the target reflector. The orientation angles of the target reflector are constantly and automatically adjusted so that the reflected light beam accurately strikes the interferometry detector. A misalignment detector senses the elevation offset and the azimuth offset of the target reflector and creates corresponding signals. The elevation and azimuth offset signals are then provided to an elevation actuator and an azimuth actuator, respectively, which correct the elevation and azimuth angles of the target reflector to maintain continuous reflection of the return beam to the interferometry detector. The misalignment detector either monitors a light source located near the interferometry detector, or splits off part of the monochromatic beam, which is directed to a four quadrant photodetector. Differences in the signal between opposite quadrants determine the angular pointing errors which are used to drive the azimuth and elevation actuators. This results in an interferometry measurement system which constantly measures distance and corrects for misalignment of the reflector.

5 Claims, 2 Drawing Sheets

SELF-ALIGNING RETROREFLECTOR TARGET CARRIER

BACKGROUND OF THE INVENTION

1. Field of the Invention

This invention relates to a system for accurately measuring distances between points.

2. Description of Related Art

Typically in the manufacture of larger parts, it is necessary to accurately measure distances between points on a past to determine if the part was manufactured correctly. This is also true in maintaining and repairing parts which have been previously manufactured. Sometimes it is necessary to determine if the part has warped, has been bent or deformed either through normal wear and tear, or by some outside abnormal force.

One such use would be in determining dimensions on a casing of a steam turbine. Typically these castings may be up to 40 feet long. Points on these castings are measured to determine if the casting meets the specifications set forth in the design of the casting or for the purpose of manufacturing replacement parts for the turbine.

One such way to measure distances is by using interferometry. Typically the light beam from a coherent, monochromatic light source (such as a laser) is split into two beams using a beamsplitter. One beam, the reference beam, is caused to fall onto a photosensitive detector. The second or measurement beam, is allowed to travel through space and strike a reflector positioned in space at the first of two measurement points. The orientation of the target reflector is adjusted so that the reflected beam from the target reflector is returned to the surface of the photosensitive detector. Here the reference and reflected measurement beams interfere. The target reflector is then moved to the second point to be measured. As the target moves, the reflected measurement light beam must continuously fall onto the photosensitive detector, continuously interfering with the reference beam. By electrically measuring the periodic variation of detector output, one can measure lengths as multiples and fractions of the wavelength of the illuminating source.

The reflective target must be continuously oriented to return the reflected beam to the active photosensitive target of the detector. Typically, the interferometry apparatus (source, photodetector module and measurement target) is fixed to an optical rail so as to allow free movement along an axis without requiring the operator to constantly align the reflect or towards the detector. The accuracy with which the reflector must be oriented will depend on the type of reflector used. One type of reflector is a flat, front surface mirror. The flat mirror gives the highest accuracy but has the most stringent alignment requirements.

A second type of reflector is a corner cube reflector. The cornercube reflector may have slightly less accuracy but requires only that the operator align the device so as to point towards the detector within a cone of perhaps 30–40 degrees in width. The reflected beam for the cornercube will emerge traveling parallel to the incoming beam, in the opposite direction and displaced from the incoming beam by a distance of twice the distance from the incoming beam to the cube center. If the apparatus is not in fixed alignment due to the presence of an optical rail, then it is the responsibility of the operator to continuously maintain alignment of reflector towards the detector.

A second type of interferometry apparatus, a tracking laser interferometer, contains mechanisms that allow the user to measure the distance to a target that is not fixed to a sliding rail. This device can steer the beam in azimuth and elevation so as to constantly track the distant target. However, the reflective target must still be manually oriented during movements of the target so as to keep the reflected measurement beam aligned towards the tracking interferometer detector. The device contains circuitry to readout the distance as well as the azimuth and elevation angles, thus enabling three dimensional coordinates to be directly read out.

Accordingly, there is a need for a device which accurately and continuously measures distances between two points in such a way as to lessen the need for continuous reflective target orientation adjustment by an operator.

SUMMARY OF THE INVENTION

A 3D distance measurement device for measuring the distance between two points in space employs a monochromatic coherent light source. The coherent light source produces an outgoing, monochromatic light beam aimed toward a distant target reflector. This reflector may be a "corner cube type" reflector in which the source beam is reflected in a direction parallel and opposite to the source beam independent of actual orientation of the reflector.

The target reflector may also be a flat mirror which will reflect the incoming beam so as to form equal incident and reflection angles with respect to the mirror normal direction.

A detection device is located close to the coherent light source. The detector device receives a portion of the beam emitted by the coherent source and mixes that beam with a portion of the light beam returned by the target reflector. Optical elements such as partially transmitting beamsplitters or prisms are used to split beams and cause mixing in the detector. Typically the reflected measurement beam is returned along a path coincident with the measurement beam but in the opposite direction to the measurement beam. The reflected measurement beam must continuously shine on the detector in order for the interferometric measurement to be successful. Thus, the orientation of the target reflectors must be continuously monitored and corrected.

One way to monitor the alignment is to have a landmark light source located at a point near the detection device or its associated optical elements.

A misalignment detector is then fixed with respect to the target reflector. The misalignment detector receives an image of the landmark light source, and determines an azimuth adjustment signal and an elevation adjustment signal indicating azimuth and elevation angular misalignment, respectively, between the reflector and the coherent light source.

An azimuth actuator, coupled to the misalignment detector and the parallel reflector, adjusts the azimuth orientation of the misalignment detector and the target reflector according to the azimuth adjustment signal.

An elevation actuator also coupled to the misalignment detector and the reflector, adjusts the elevation orientation of the misalignment detector and the reflector according to the elevation adjustment signal received from the misalignment detector.

In still another embodiment, the landmark light source is replaced with a beamsplitter at the reflective target. It splits off a portion of the incoming measurement beam into a separated beam which is passed to the misalignment detector. Optionally a lens may be used to focus the separated beam onto the misalignment detector. The misalignment detector determines azimuth and elevation adjustment signals. The remainder of the system functions as described above.

One such way of creating the misalignment detector is to employ a two-dimensional photo detector. It receives the image of the landmark light source (or separated beam) and creates a first and second azimuth signal indicating the offset in a first direction of the landmark light source image (or separated beam) on the photo detector. It also creates a first and second elevation signal indicating the offset in a second direction of the landmark light source image (or separated beam) on the photo detector.

An azimuth difference device receives the azimuth signals from the two-dimensional photo detector and subtracts the first azimuth signal from the second azimuth signal to produce an azimuth adjustment signal employed by the azimuth actuator in adjusting the parallel reflector. If desired, an operator specified azimuth offset may be further added to the azimuth adjustment signal to allow for orienting the reflector at an angle with respect to the light source or sources.

Similarly, an elevation difference device receives the elevation signals from the two-dimensional photo detector and subtracts the first elevation signal from the second elevation signal to produce an elevation adjustment signal employed by the elevation actuator in adjusting the parallel reflector. If desired, an operator specified elevation offset may be further added to the elevation adjustment signal to allow for orienting the reflector at an angle with respect to the light source or sources.

OBJECTS OF THE INVENTION

It is an object of the present invention to provide a system for accurately measuring distances between two reference points.

It is another object of the present invention to provide a continuous distance measurement between a coherent light source, a target reflector and a sensor device requiring little operator attention to maintaining target orientation.

BRIEF DESCRIPTION OF THE DRAWINGS

While the novel features of the invention are set forth with particularly in the appended claims, the invention, both as to organization and content, will be better understood and appreciated, along with other objects and features thereof, from the following detailed description taken in conjunction with the drawings, in which:

DETAILED DESCRIPTION OF THE INVENTION

In many applications, it is important to determine distances between points accurately. Sometimes it is also important to measure these continuously to produce a mapping of surfaces. Typically a cube reflector and a monochromatic coherent light source and an interferometry detector are employed. In order to measure distance using interferometry, a portion of the source beam is mixed with the reflected image of the originally outgoing source beam. The source beam is reflected from a target reflector positioned at the point to be measured. The problem arises when the returning reflected beam is outside of the solid angle at which the detector can accept beam input. This would cause a break in the continuity and require the measurements to be started from the beginning to insure accurate results. This can be very time-consuming and wasteful.

The present invention provides a simple system for monitoring and adjusting the measurement system so that there is no break in continuity. This results in quicker, more accurate measurements and surface maps which are very valuable in manufacturing.

Figure 1:
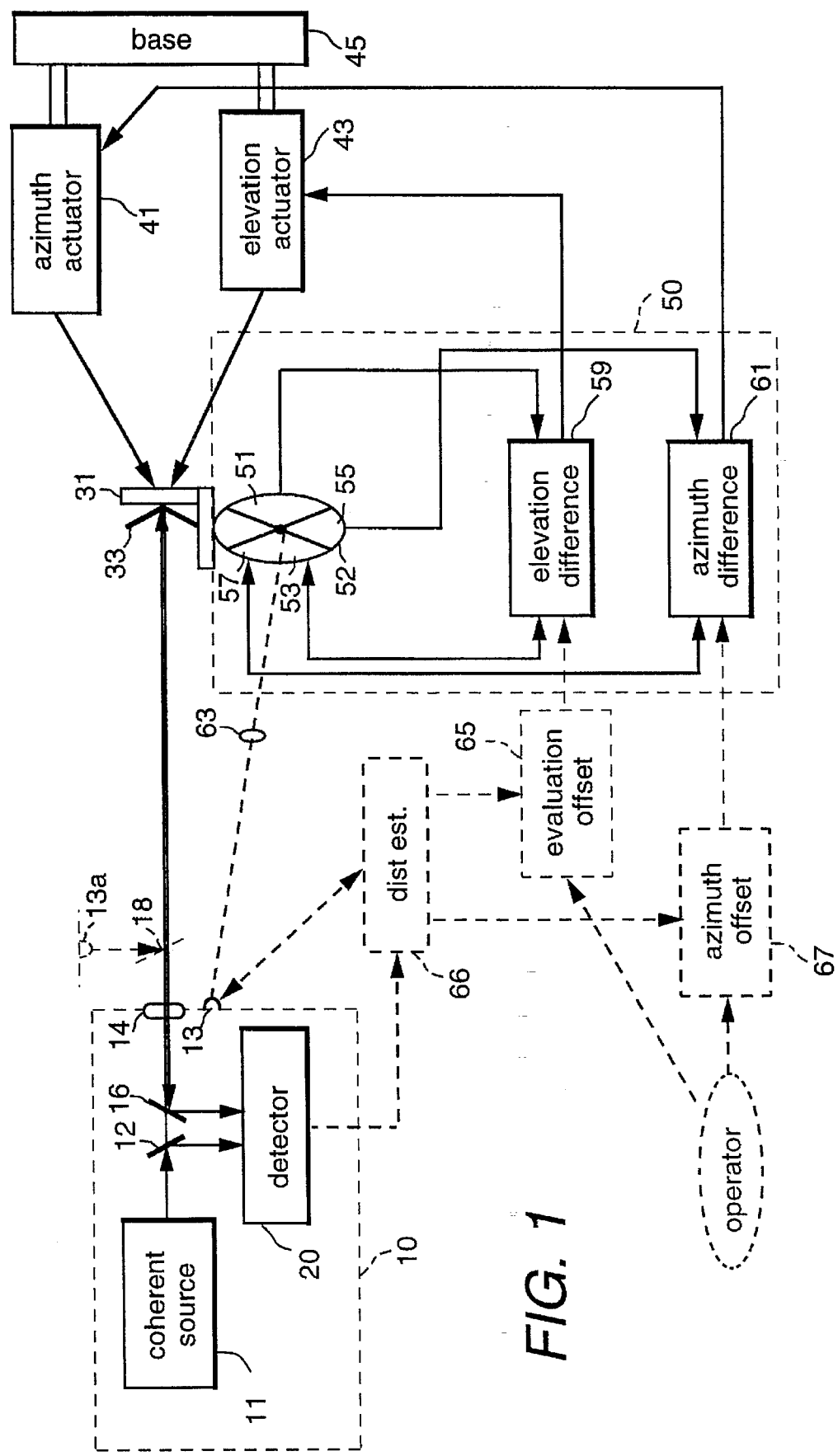
FIG. 1 is a simplified block diagram of an embodiment of a distance measurement device according to the present invention.

A first embodiment of the self-aligning retroreflector target carrier is shown in FIG. 1. A source/detector unit 10 has a monochromatic coherent light source 11 which provides a monochromatic coherent light beam. A portion of the light beam is split off by beamsplitter 12 forming a local reference beam which strikes detector 20. The remainder of the beam passes through beamsplitter 16, exits through aperture 14, travels through space and impinges upon reflector 33, preferably a corner cube reflector. Reflector 33 reflects light back as a reflected beam parallel to the measurement beam but in the opposite direction. The reflected beam remains oriented parallel to the measurement beam independent of actual reflector orientation as long as reflector 33 remains approximately oriented within an acceptance cone approximately 30–40 degrees in extent and measured with respect to the measurement light beam from source/detector unit 10. The returning reflected beam passes through aperture 14 striking beamsplitter 16. Beamsplitter 16 causes a portion of the returning reflected beam to strike detector 20. The mixture of the reference beam from beamsplitter 12 and the return beam from beamsplitter 16 allows detector 20 to employ interferometry to determine the distance the beam traveled. The reflector 33 is carded in a cradle 31.

If reflector 33 is oriented such that the reflected beam lies outside the 3D acceptance cone of aperture 14, the reflected beam may not impinge upon detector 20. In order to cause proper positioning of reflector 33, the degree of misalignment is detected by misalignment detector 50 and the azimuth and elevation of parallel reflector 33 are adjusted by azimuth actuator 41 and elevation actuator 43, respectively. The misalignment detector 50 is mounted in a fixed orientation with respect to cradle 31.

A landmark light source, such as a light emitting diode (LED), 13, is positioned as close as possible to aperture 14. An alternate arrangement makes use of an auxiliary beamsplitter 18 and an LED 13a to form a landmark light source optically located within the aperture 14. Misalignment detector 50 employs a lens 63 which allows an image of LED 13 to be focussed onto a small two-dimensional optical detector, such as a quadrant photodetector or a lateral photodiode shown as 51, 53, 55, 57. Although shown as four units, a quadrant photodetector is usually fabricated as a single monolithic entity. These photodetectors develop signals proportional to the fraction of the image of the spot falling on the quadrant photodetector surface.

An elevation difference device 59 coupled to quadrants 53 and 51 subtracts the signals to produce an elevation adjustment signal.

In an alternative embodiment, an elevation offset device 65 provides an elevation offset signal which is used to offset the difference in signals measured from quadrants 53 and 51. This elevation offset signal may be a fixed angular elevation value which may be stored, or directly provided by an operator. The offset signal may be a calibrated amount to correct any device misalignment.

The offset signal may also be used to correct the pointing angle as the target 33 is moved away, or toward, the source/detector 10. The distance between the center of target reflector 33 and the center of the receiving point for misalignment detector 50, the distance between the center of landmark light source 13 and the center of aperture 14, and the approximate distance between source/detector 10 and target reflector 33 are used by elevation difference device 59 to calculate an approximate angular elevation offset, and use it to correct the signals measured from quadrants 53 and 51 to result in an elevation adjustment signal. In the embodiment where the landmark source 13a is reflected off of auxiliary splitter 18, the distance between the landmark source 13a and aperture 14 is negligible.

The distance between the source/detector 10 and target reflector 33 must be known to perform the geometric calculation. One simple method is for the operator to input the approximate distance in which measurements are to be performed.

Another optional embodiment employs a separate distance estimation device 66, such as an ultrasound or infrared distance measurement device, to determine an approximate distance.

In still another embodiment, detector 20 may provide the distance from source/detector 10 to target reflector 33 for use in determining angle offsets by distance estimator 66.

Similarly, quadrants 55, 57 and azimuth offset device 67 are connected to a difference detector 61 which determines an azimuth adjustment signal the same as described above for the elevation adjustment signal.

An elevation actuator 43 and an azimuth actuator 41 are connected to a base 45. Azimuth actuator 41 and elevation actuator 43 are also coupled to cradle 31 carrying reflector 33. Elevation actuator 43 receives the elevation adjustment signal from elevation difference device 59 and moves elevation actuator 43 thus moving cradle 31 and reflector 33 accordingly.

Similarly, azimuth actuator 41 receives the azimuth adjustment signal from azimuth difference device 59 and moves azimuth actuator 41 thus moving cradle 31 carrying reflector 33.

Since this is an interactive system, measurements are constantly being acquired and adjustments by azimuth actuator and elevation actuator 41, 43, respectively, are constantly being performed to cause reflector 33 to maintain its reflected return beam to lie within the solid angle acceptance cone of aperture 14 such that detector 20 continuously receives a signal.

Figure 2:
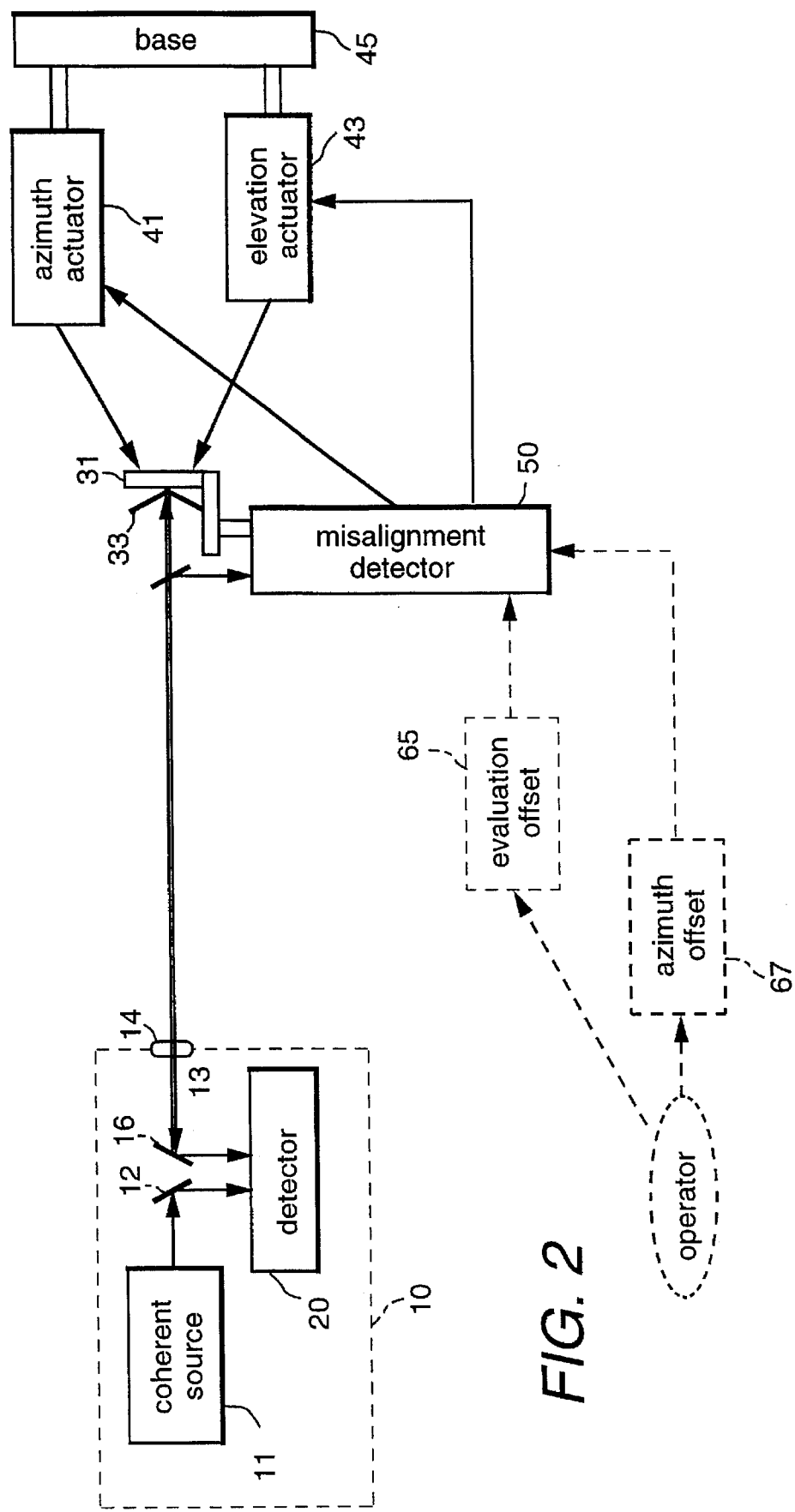
FIG. 2 is a simplified block diagram of another embodiment of a distance measurement device according to the present invention.

A second embodiment of the present invention is shown in FIG. 2. Instead of using a separate landmark source, shown as LED 13 (or alternatively 13a) of FIG. 1, this embodiment employs a beamsplitter 35 which splits the incoming beam at the target reflector 33 and provides a portion of the beam, as a separated beam to photodetectors 51, 53, 55 and 57. As before, difference devices 59 and 61 determine elevation and azimuth adjustment signals to provide to elevation actuator 43 and azimuth actuator 41, respectively.

Detector 20 of both FIGS. 1 and 2 is a photo interferometry measurement device. Typically, this device receives the a reference portion of the outgoing beam from beamsplitter 12 and laser source 11 and also receives the reflected beam from reflector 33, via beamsplitter 16 through aperture 14, and mixes these two beams to constructively and destructively interfere and create a pattern representative of the difference in length traveled between the two beams. This difference in length is used to determine the distance between laser source 11 (or the detector 20) and reflector 33. This measured distance may be adjusted by known distances between coherent source 11 and detector 20 to result in the distance between coherent source 11 (or detector 20) and reflector 33.

Since reciprocity applies, it make little difference if the position of the reflector is moved, sensed and adjusted, or if the monochromatic source is moved, sensed and adjusted, or both are moved, sensed and adjusted, relative to each other.

While specific embodiments of the invention have been illustrated and described herein, it is realized that modifications and changes will occur to those skilled in the art. It is, therefore, to be understood that the appended claims are intended to cover all such modifications and changes as fall within the true spirit and scope of the invention.

What is claimed is:

1. A device for continuously determining changes in distance to a target reflector comprising:
   a) a coherent light source for providing a monochromatic coherent light outgoing beam;
   b) a target reflector located for receiving and reflecting the outgoing beam as a reflected beam;
   c) a detection device located at a known location relative to the coherent source for calculating a relative distance traveled between the outgoing beam and reflected beam;
   d) a landmark source for emitting light, located at a known location relative to the detection device,
   e) a misalignment detector fixed with respect to the target reflector for receiving an image of the landmark source and determining an azimuth adjustment signal and an elevation adjustment signal indicating azimuth and elevation misalignment, respectively, between the target reflector and the coherent source;
   f) an azimuth actuator coupled to the misalignment detector and the reflector for adjusting the azimuth orientation of the misalignment detector and the target reflector according to the azimuth adjustment signal; and
   g) an elevation actuator coupled to the misalignment detector and the target reflector for adjusting the elevation orientation of the misalignment detector and the target reflector according to the elevation adjustment signal.

2. The device for continuously determining changes in distance of claim 1 wherein the misalignment detector comprises:
   a) a two-dimensional photo detector for receiving the image of the landmark source and creating a first and second azimuth signal indicating the offset in a first direction of the landmark source image on the photo detector, and for creating a first and second elevation signal indicating the offset in a second direction of the landmark source image on the photo detector;
   b) an azimuth difference device coupled to the two-dimensional photo detector, for subtracting the first azimuth signal from the second azimuth signal and adding an azimuth offset signal provided to it to produce an azimuth adjustment signal; and
   c) an elevation difference device coupled to the two-dimensional photo detector, for subtracting the first elevation signal from the second elevation signal and adding an elevation offset signal provided to it to produce an elevation adjustment signal.

3. The device for continuously determining changes in distance to a target reflector of claim 1 further comprising:

a) an elevation offset device coupled to the elevation difference device, for providing an elevation offset signal to the elevation difference device; and b) an azimuth offset device coupled to the azimuth difference device, for providing an elevation offset signal to the azimuth difference device.

4. A device for continuously determining changes in distance to a target reflector comprising:

a) a coherent light source for providing a monochromatic coherent light outgoing beam;

b) a target reflector located for receiving and reflecting the outgoing beam as a reflected beam;

c) a detection device located at a known location relative to the coherent source for calculating a relative distance traveled between the outgoing beam and reflected beam;

d) a beamsplitter for separating a portion of either beam to produce a separated beam;

e) a misalignment detector fixed with respect to the target reflector for receiving the separated beam and determining an azimuth adjustment signal and an elevation adjustment signal indicating azimuth and elevation misalignment, respectively, between the target reflector and the coherent source;

f) an azimuth actuator coupled to the misalignment detector and the reflector for adjusting the azimuth orientation of the misalignment detector and the target reflector according to the azimuth adjustment signal; and g) an elevation actuator coupled to the misalignment detector and the target reflector for adjusting the elevation orientation of the misalignment detector and the target reflector according to the elevation adjustment signal.

5. The device for continuously determining changes in distance of claim 4 wherein the misalignment detector comprises:

a) a two-dimensional photo detector for receiving the separated beam and creating a first and second azimuth signal indicating the offset in a first direction of the separated beam on the photo detector, and for creating a first and second elevation signal indicating the offset in a second direction of the separated beam on the photo detector;

b) an azimuth difference device coupled to the two-dimensional photo detector, for subtracting the first azimuth signal from the second azimuth signal and adding a fixed azimuth offset signal to produce an azimuth adjustment signal; and c) an elevation difference device coupled to the two-dimensional photo detector, for subtracting the first elevation signal from the second elevation signal and adding a fixed elevation offset signal to produce an elevation adjustment signal.

* * * * *